United States Patent [19]

Ferguson

[11] Patent Number: 4,674,529
[45] Date of Patent: Jun. 23, 1987

[54] CHECK VALVE

[76] Inventor: Sean M. Ferguson, 9202 Carousel La., Houston, Tex. 77080

[21] Appl. No.: 863,162

[22] Filed: May 14, 1986

[51] Int. Cl.[4] ............................................. F16K 15/00
[52] U.S. Cl. ............................... 137/375; 137/533.13; 137/533.17; 137/515.5; 137/515.7
[58] Field of Search .............. 137/528, 533.11, 533.13, 137/533.15, 515.5, 515.7, 375; 251/367

[56] References Cited

U.S. PATENT DOCUMENTS 3,367,362  2/1968  Hoffman ........................ 137/533.11
3,498,315  3/1970  Graves et al. ........................ 137/375
3,911,502  10/1975  Boretos ........................... 137/533.11

*Primary Examiner*—A. Michael Chambers
*Attorney, Agent, or Firm*—Kinzer, Plyer, Dorn & McEachran

[57] ABSTRACT

This invention is concerned with a check valve made up of two housings or castings, each of which has a corrosion resistant liner which provides improved support and operation of the ball or check member and increased resistance to liner collapse when operating under vacuum conditions.

5 Claims, 6 Drawing Figures

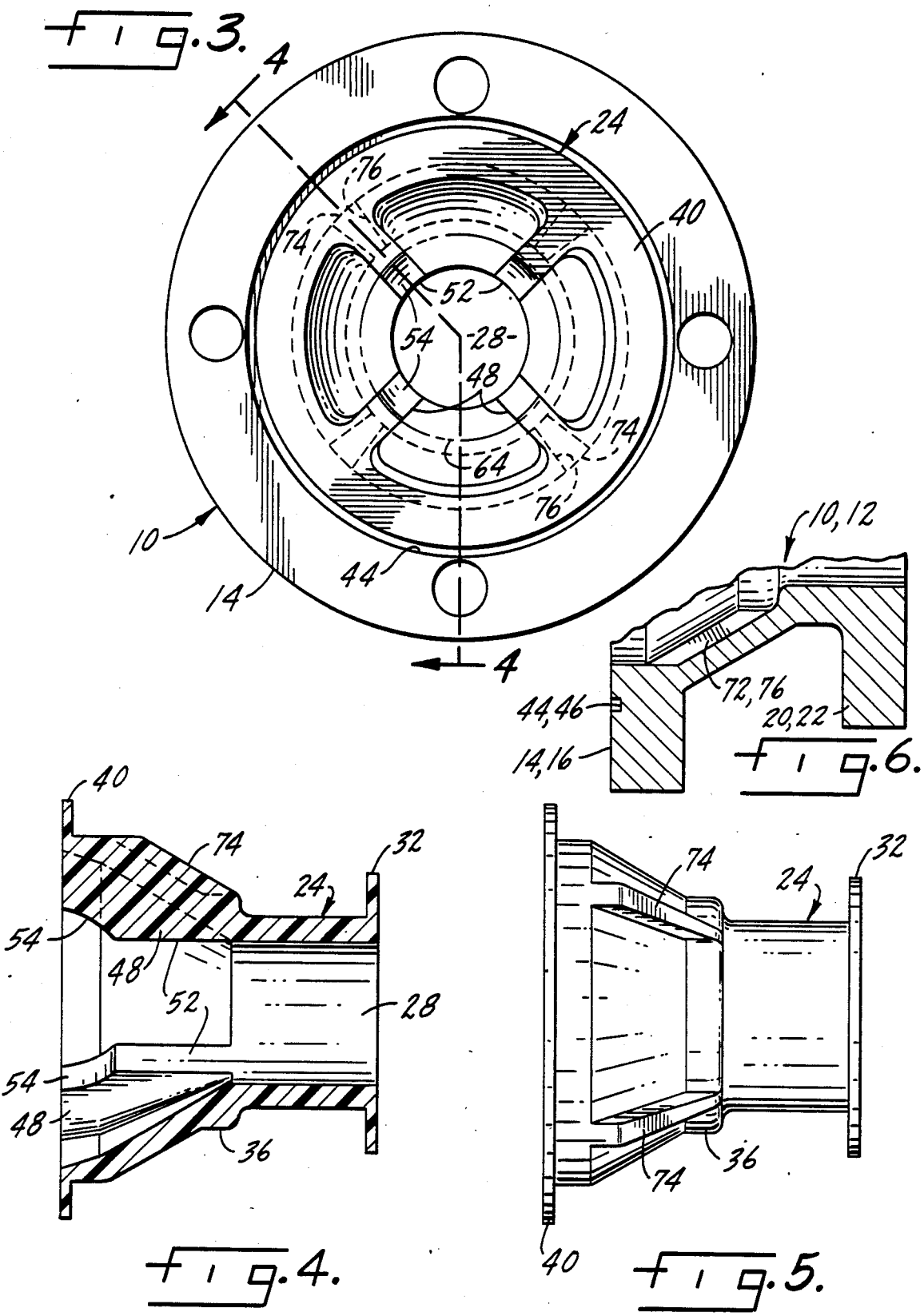

CHECK VALVE

SUMMARY OF THE INVENTION

This invention is concerned with a check valve which uses a movable ball as the valve check member and is lined with a corrosion resistant liner or liners which provide improved ball support and operation.

A primary object is a corrosion resistant liner and valve body combination with integrally formed ribs on the inside of the liners which are offset.

Another object is a ball check of the above type which has greater flow capacity and less turbulence.

Another object is a ball check valve of the above type in which the ball is supported by both halves of the liner when in the flow position.

Another object is a liner and valve combination in which the ball is never entirely in one half or the other.

Another object is a ball check valve of the above type in which alignment of the ball is provided by all of the ribs at the same time.

Another object is a ball check valve of the above type in which the ball is supported at a plurality of points about its circumference.

Another object is a ball check valve with a liner having ribs on both the outside and inside which prevent collapse in vacuum service.

Another object is a ball check valve of the above type in which the liners are interlocked to the housing or body members.

Another object is an interlock between the liners and housing in a check valve of the above type to protect against the effect of thermal expansion and contraction.

Another object is a design of the above type which allows the liners to be field repairable.

Another object is a check valve of the above type with an interlock between the liner and housing that prevents rotational misalignment.

Another object is a ball check valve with liners of the above type which allows new liners to be field flared.

Another object is a ball check valve which is usable with or in water and waste water treatment systems, slurry systems such as in paper mills, brine filtration installations, solids digestors and so forth.

Other objects will appear from time to time in the ensuing specification and drawings.

BRIEF DESCRIPTION OF THE DRAWINGS

FIG. 3 is a view along line 3—3 of FIG. 1 showing the flow side of the valve;

FIG. 4 is a section along line 4—4 of FIG. 3 but of the liner only;

FIG. 5 is a side view of the liner of FIG. 4; and

FIG. 6 is a detail section of the liner groove portion of the valve body of FIG. 1.

DETAILED DESCRIPTION OF THE PREFERRED EMBODIMENT

Figure 1:
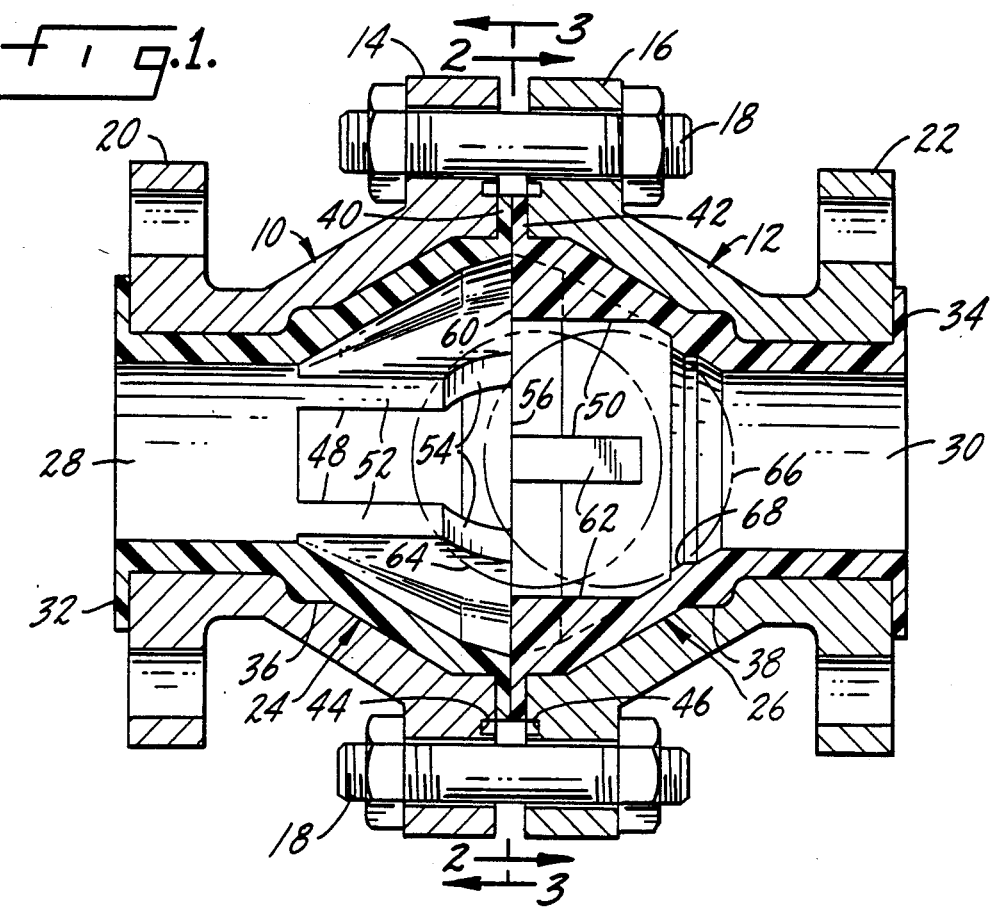
FIG. 1 is a cross section through the axis or center line of the valve.

In FIG. 1, the valve has a housing which is made up of two parts or housing halves 10 and 12 which may be more or less mirror images of each other. Each has an inner enlarged flange 14 and 16 with a suitable number of openings and bolts 18 therethrough for securing two housing halves together. The outer end of each housing part has another flange 20 and 22 with openings or bolt holes to provide for connection to pipes or a fluid system in a conventional manner.

Each housing half has or holds a liner 24 and 26, the liner 24 being on the flow side and the liner 26 on the check side as explained later. The liners define or provide ports, 28 being the outlet port and 30 being the inlet port. The liners may be flanged on the ends as at 32 and 34 to abut and seal against adjacent or connecting piping. Each of the liners may have a circumferential enlargement 36 and 38 on the exterior which fits into a corresponding groove on the inside of each of the housing halves to stabilize against ball action. The interior of the liners have outwardly disposed face flanges 40 and 42 terminating at locator grooves 44 and 46.

Each of the liners has a plurality of internal ribs 48 and 50, shown in this case as 4 although it might be otherwise. The ribs 48 on the outlet or flow liner or flow side have generally parallel axially extending initial planar surfaces 52 followed by outwardly diverging curvilinear seat portions 54 which terminate at the parting line or central plane 56 of the liners at an abrupt right angle shoulder.

The liner 26 on the check side has a plurality of ribs 50, shown in this case as 4, which terminate at the parting line or central plane 56 in abrupt or right angle shoulders 60. It will be noted in FIGS. 1, 2 and 3, that the ribs in one liner half are misaligned or circumferentially offset or indexed relative to the ribs in the other liner half. Also, the maximum diameter of the seats or stops 54 is smaller than the distance between the inner surfaces 62 of the ribs 50 on the check side so that the ball member, shown in broken lines at 64, never fully enters the flow side liner. This is to say that the maximum diameter of the ball or check member never crosses the center line or plane 56, and the position indicated in broken lines at 64 may be considered to be that of the ball or check member when it is in engagement with the stops 54 on the flow side ribs. It will be noted that the maximum diameter of the ball in the position 66 is to the right of the parting line 56 in FIG. 1. Thus when the fluid or liquid is flowing from left to right, the ball will be in the check position 66 in which the majority of the ball is to the right of the center or parting line 56. Since the ribs in one liner are offset relative to the ribs in the other, when in a flow position 64, the ball will be in contact with or supported by all of the ribs on both liners which prevents ball chatter or vibration and insures smooth fluid flow with a minimum, if any, turbulence as well as greater flow through.

The check side liner 26 has an annular seat 68 which the ball engages in the broken line position 66 and prevents fluid flow from left to right.

The exterior of the check side liner 26 has a plurality of upwardly projecting somewhat radially disposed ribs 70, shown in this case as 4, which interfit and are interlocked into corresponding channels or grooves 72 in the casting or housing half which will prevent or resist any tendency of the liner to rotate or inch peripherally. It will be noted in FIG. 2 that the exterior ribs 70 are misaligned radially with the internal ribs 50 of the check side liner. Since four of each are used and are equally spaced, the exterior and interior ribs are at 45° to each other. This greatly strengthens the liner and will fully resist any tendency of the liner to collapse in vacuum operation.

As shown in FIG. 3, the flow side liner has similar external ribs 74 which may be radially aligned with the internal ribs as shown in FIG. 3 which also provides strengthened conditions to enable the liner to resist collapse during vacuum service. As with the check side liner, the ribs 74 on the flow side liner fit in corresponding grooves 76 in the flow side housing or casting 10.

Figure 2:
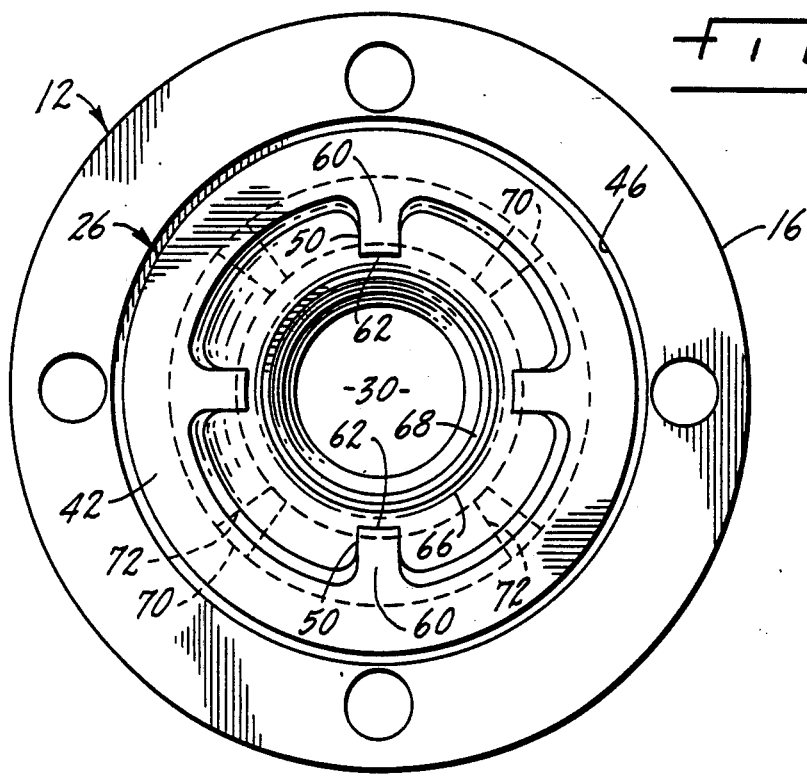
FIG. 2 is a view along line 2—2 of FIG. 1 showing the check side of the valve.

In certain situations, the misaligned relationship shown in FIG. 2 may be used with both liners. But it is considered more important in certain applications to make the housing halves identical so that any two may be used. The flow side liner may be formed with the inside and outside ribs radially aligned so that the flow side inside ribs are misaligned with the check side inside ribs.

In other installations it may be desirable to provide additional holes on the inside flange of the housing or casting, for example, 8 with only 4 being used. In that situation, two housings or castings could be indexed relative to each other which would allow misalignment between the interior and exterior ribs on both liners and, at the same time, axial misalignment of the inside ribs on one liner relative to the inside ribs on the other. The particular combination used will depend upon the size of the check valve and the particular application or service.

While the preferred form and several variations have been suggested, it should be understood that other variations and changes may be used without departing from the invention. For example, the closing member has been referred to as a ball, and it should be understood that balls can be other than round. For example, it might be oblong, spherical, conical and flat at one end, etc.

I claim:

1. In a ball check valve, a pair of juxtaposed housing members having a ball cavity between them, aligned ports in the housing members in communication with the ball cavity providing an inlet and outlet for fluid flow, liners inside the housing members defining the ball cavity, one in each housing member and made of a relatively non-corrosive material, a plurality of generally equally circumferentially spaced radially inwardly projecting guide ribs integrally formed on the inner surface of each liner, the ribs on one liner being longitudinally offset from the ribs on the other, a ball disposed within the cavity between the rib and of a size to move freely in a longitudinal direction, stops on at least some of the ribs of one of the liners to hold the ball in spaced relation to its port to allow fluid to flow therethrough when the ball is in contact with the stops, the stops being positioned so that the major lateral dimension of the ball is aligned with the ribs in the other liner when the ball is in contact with the stops so that the ball is supported by the ribs in both liners at the same time when the ball is in its flow position, and a circumferential seat in the other liners sized to engage the ball and to prevent fluid flow out through its port when the ball is in engagement therewith.

2. The structure of claim 1 further characterized in that the ribs on one liner are longitudinally misaligned with the ribs on the other liner so that the support for the ball indexes circumferentially when the liner is in engagement with the stops in its flow position.

3. In a ball check valve, a pair of juxtaposed housing members having a ball cavity between them, aligned ports in the housing members in communication with the ball cavity providing an inlet and outlet for fluid flow, liners inside the housing members defining the ball cavity, one in each housing member and made of a relatively corrosion resistant material, a plurality of generally equally circumferentially spaced radially inwardly projecting guide ribs integrally formed on the inner surface of each liner, a ball disposed within the cavity between the ribs and of a size to move freely in longitudinal directions, stops on at least some of the ribs of one of the liners to hold the ball in spaced relation to its port to allow fluid to flow therethrough when the ball is in contact with the stops, a circumferential seat in the other liner sized to engage the ball and to prevent fluid flow out through its port when the ball is in engagement therewith, a plurality of external, generally equally circumferentially spaced longitudinally extending ribs integrally formed on the outer surface of each liner fitted into it a plurality of corresponding longitudinally disposed slots in the housing members so that the liners are interlocked therewith, the inner ribs on at least one liner being radially offset from its outer ribs so that the liner will resist collapsing in vacuum service and rotation of the liner.

4. The structure of claim 3 further characterized in that the ribs on one liner are longitudinally misaligned with the ribs on the other liner.

5. The structure of claim 3 further characterized in that the stops are positioned so that the major diameter of the ball is in contact with the ribs in the other liner when the ball is in contact with the stops so that the ball is supported by the ribs in both liners when in the flow position.

* * * * *